INVENTOR.
FABIO DE AZEVEDO OLIVEIRA

BY Kimmel, Crowell & Weaver
ATTORNEYS.

3,274,651
METHOD FOR INJECTING SAND IN
MOULDING MACHINES
Fabio de Azevedo Oliveira, Rua Atlantica 114,
Sao Paulo, Brazil
Filed Mar. 29, 1965, Ser. No. 443,346
4 Claims. (Cl. 22—193)

The present invention relates to an apparatus and method for injecting sand and similar pulverized material in a moulding core blowing machine, machines for shell moulding plates, hot-box or other machines to form moulded parts.

It is an object of the present invention to provide a method of supplying sand and similar pulverized material into a moulding core apparatus under low pressure, and thereafter compressing the material at a higher pressure so as to properly fill the mould core and thereafter release the pressure on the material without causing any of the material to be carried downstream of the apparatus so as to cause wear of the valves in the system.

It is another object of the present invention to provide a method for injecting moulding material into a mould core and the like and after the mould core has been properly filled, filtering means are provided for permitting the discharge of air pressure therefrom without carrying any of the material downstream in the system.

It is another object of the present invention to provide a method of injecting sand and similar pulverized material into a moulding apparatus, provided with automatic supply means for replenishing the sand or pulverized material used in the moulding core, as necessary.

Various other objects and advantages of the present invention will be readily apparent from the following detailed description when considered in connection with the accompanying drawing forming a part thereof and in which FIGURE 1 illustrates the apparatus embodied in the present invention for carrying out the method of the invention;

Figure 1:
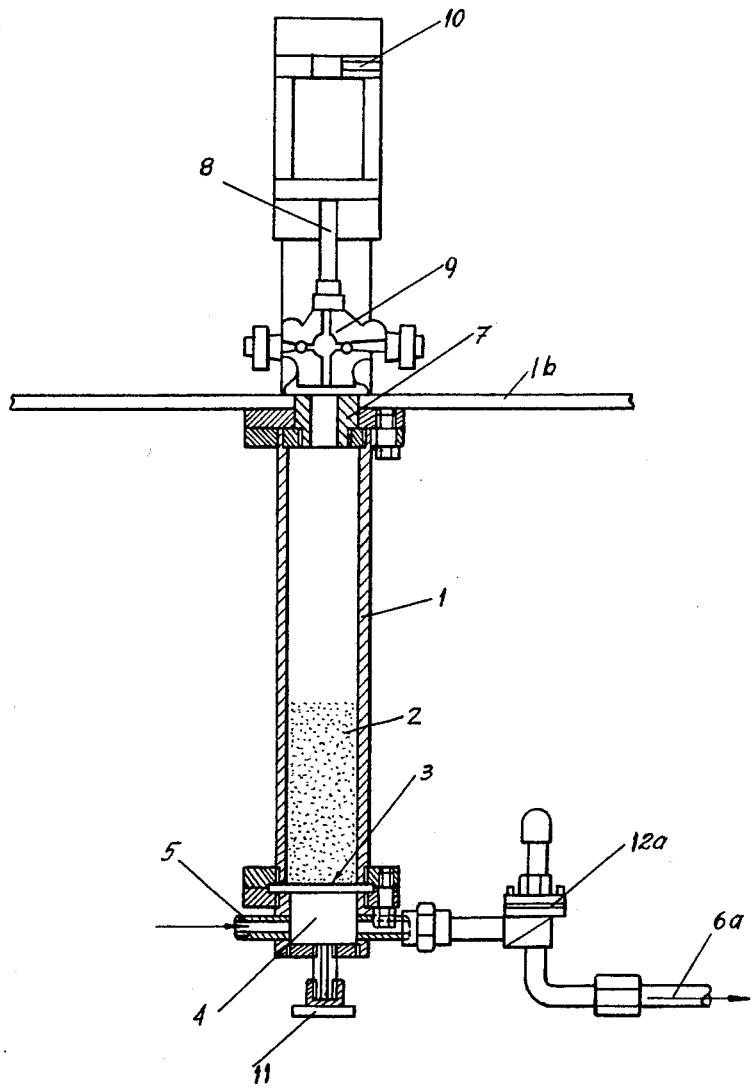

Referring to the drawings the reference numeral 1 generally designates a cylindrical or tubular drum or member commonly known as an injector device containing a deposit of sand or pulverized material 2 therein.

The bottom flanged end of the injection device 1 is provided with a filter 3 extending transversely thereacross which filter may be of any type, such as a woven wire screen and of sufficient strength so as to support the column of sand 2 in the tube. An air pressure chamber 4 is provided in the apparatus below the filter 3 and has an air inlet supply line 5 in communication therewith and an air outlet or discharge line 6a in communication therewith. A control valve 12a is provided in the outlet line 6a. An inspection member 11 of well known construction is provided in the bottom of the chamber 4 for inspecting and cleaning out the apparatus, if necessary.

The upper end of the injection device or tube 1 is provided with a flange construction and is adapted to receive a nozzle 7 of predetermined size. The nozzle 7 can be of various sizes and determined by the mould to be filled with the sand. The nozzle is well known in the art and does not form the present invention. The drum or injection device 1 is carried by any suitable means by a member indicated as 1a and a preheated mould member 9 is disposed and supported on the member 1a and communicates with the interior of the injection drum 1 through the nozzle 7. The apparatus is also provided with a piston 8 of well known construction in the art disposed in a well known device 10 known in the moulding art. The piston 8 is adapted to be moved downwardly by well known means so that the top of the mould 9 is closed off.

Figure 2:
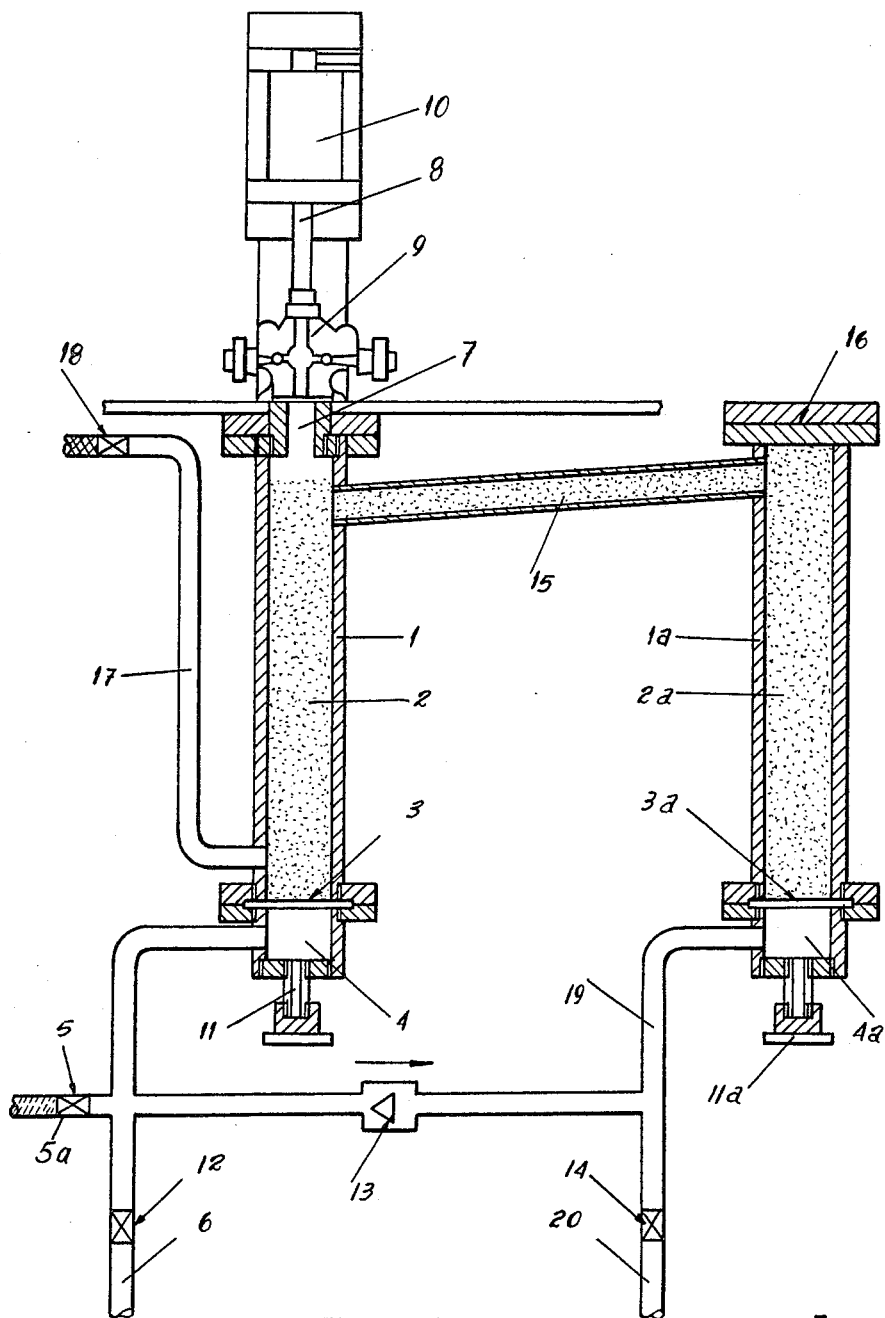
FIGURE 2 is a view illustrating the apparatus embodied in the present invention including automatic supply means for adding additional moulding material to the mould machine when required.

When it is desired to fill the mould 9 with the sand 2 from the interior of the injection device 1 through the nozzle 7, the apparatus is disposed in the position shown in FIGURE 1. At this time the valve 12a in the air outlet line 6a is closed and a valve in the air inlet line 5, and shown as 5a in FIGURE 2, is open so that low pressure air for example 2 kg./cm.$^2$ is supplied to the interior of the chamber 4. The air passes through the filter 3 and forces the sand 2 upwardly into the mould 9 until it is properly filled.

After this operation, the valve 12a is opened and the air supply through line 5a is cut off so that the sand in the injection device 1 returns to the lower portion thereof. The porosity of the filter 3 is of such a size that no sand can pass therethrough and therefore no sand will be carried downstream to damage the valve 12a. The air outlet line 6a is in communication with the atmosphere at this time so that any excess air pressure above atmospheric pressure is dissipated.

Thereafter the mould 9 may be removed by well known means from the apparatus and submitted to further moulding operations not concerned with the present invention.

Referring to FIGURE 2, it will be noted that the present invention is provided in this view with an automatic supply means consisting of a tubular member or drum 1a filled with additional sand deposit 2a. The supply tube or drum 1a is very similar to the injection tube or drum 1 and is provided with a filter 3a similar to the filter 3 of injector drum 1. The supply drum 1a is preferably supplied with additional sand through a sand loading device generally designated as 16 and being of well known means and not forming part of the present invention. The upper end of the supply drum 1a is connected to the upper end of the injector drum 1 by a supply line or pipe 15 being inclined downwardly from the supply drum 1a to the injector drum 1 so as to feed or supply the sand from the drum 1a to the injector drum 1.

The lower end of the supply drum 1a is provided with a chamber 4a substantially the same as the chamber 4 for injector drum 1. The chamber 4a is provided with an inspection and cleaning member 11a.

The low pressure air supply inlet line 5 is connected to the chamber 4a of the automatic supply device 1a by a crossconecting line 19. The line 19 is provided with a one-way check valve 13 therein which permits flow in the direction of the arrow indicated in FIGURE 2. The line 19 is connected with the line 5 downstream of the valve 5a therein so that it also communicates with the chamber 4 and is in communication with the air outlet line 6, similar to air outlet line 6a in FIGURE 1. The valve 12 corresponds to the valve 12a in air outlet line 6a. Crossconnecting line 19 is in communication with a discharge air outlet line 20 having a valve 14 therein disposed downstream of the one-way check valve 13.

Where the automatic supply device is utilized with the injector device 1, a high pressure air inlet line 17 is provided in communication with the lower portion of the injector device 1, as shown in FIGURE 2. This line is provided with a valve 18 therein.

In operation and referring to FIGURE 2, the apparatus and method of the present invention is first filled with sufficient sand 2 and 2a in the members 1 and 1a respectively. The injection tube 1 is preferably filled by supplying sand thereto through the nozzle 7 after the apparatus on the top thereof is removed by any suitable means. The sand is supplied into the drum or automatic supply tube device 1a by removing the cover 16 by any well known means.

After the device has been properly filled with a sufficient amount of sand as shown in FIGURE 2, it is then ready to be placed in operation. The mould 9 is in the position shown with the piston 8 in a downward position closing off the top of the mould 9. At this time the high pressure air inlet valve 18 is closed and valves 12 and 14 are closed while the low pressure air inlet valve 5a is closed.

Figure 3:
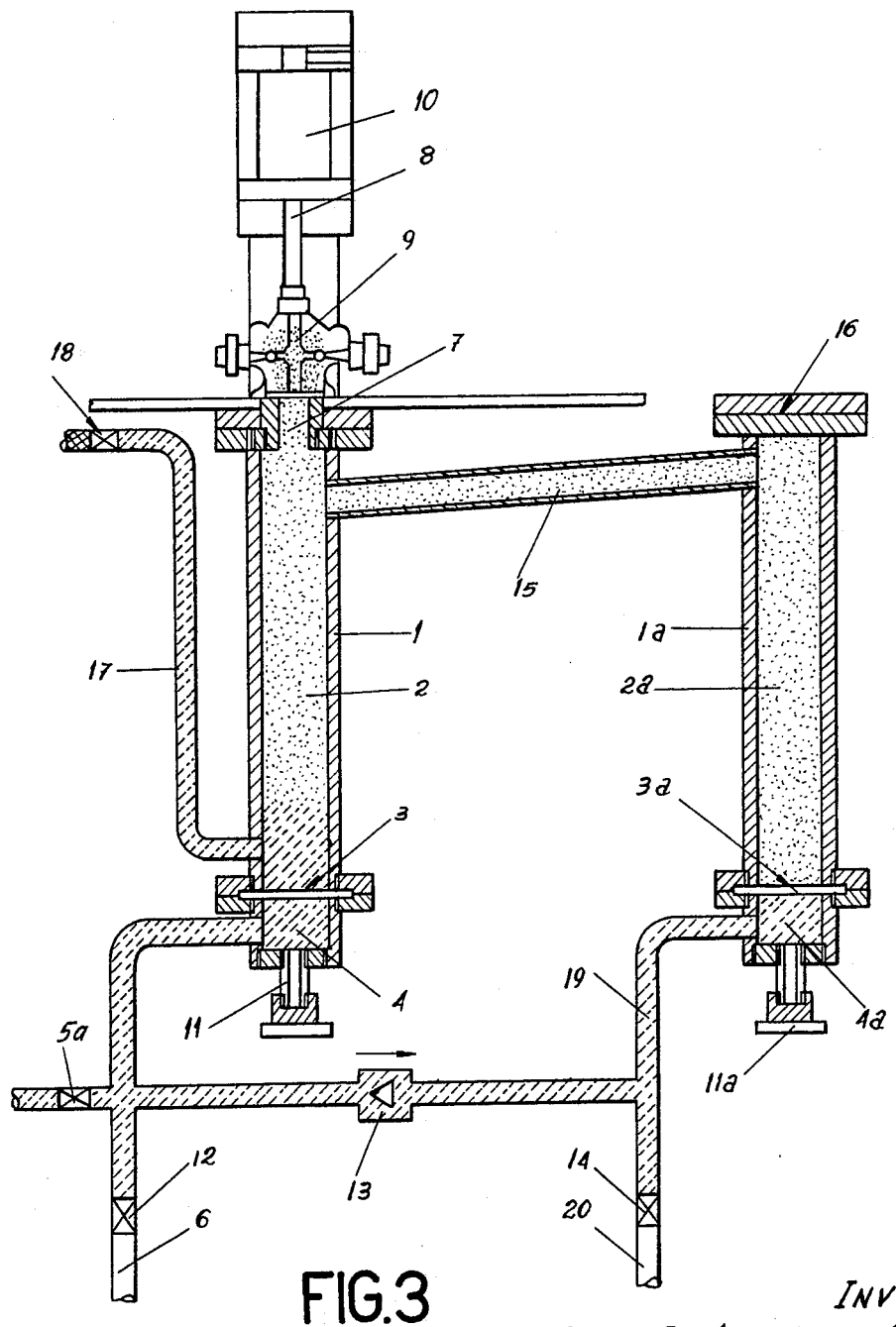
FIGURE 3 is a view similar to FIGURE 2 but illustrating the step of applying low pressure to the sand utilized in the system to properly fill the mould cavity.

Referring to FIGURE 3 this illustrates the device when the valve 5a is opened and the valves 12, 14 and 18 remain closed. At this time the low pressure air will enter the crossconnecting line 19 and the chamber 4a as well as the chamber 4. This is indicated symbolically in the drawings. The low pressure will also flow into the line 17 and up to the closed valve 18. The low pressure air will force or lift the sand 2 upwardly into and through the nozzle 7 so as to fill the cavity of the mould 9 as indicated in FIGURE 3.

Figure 4:
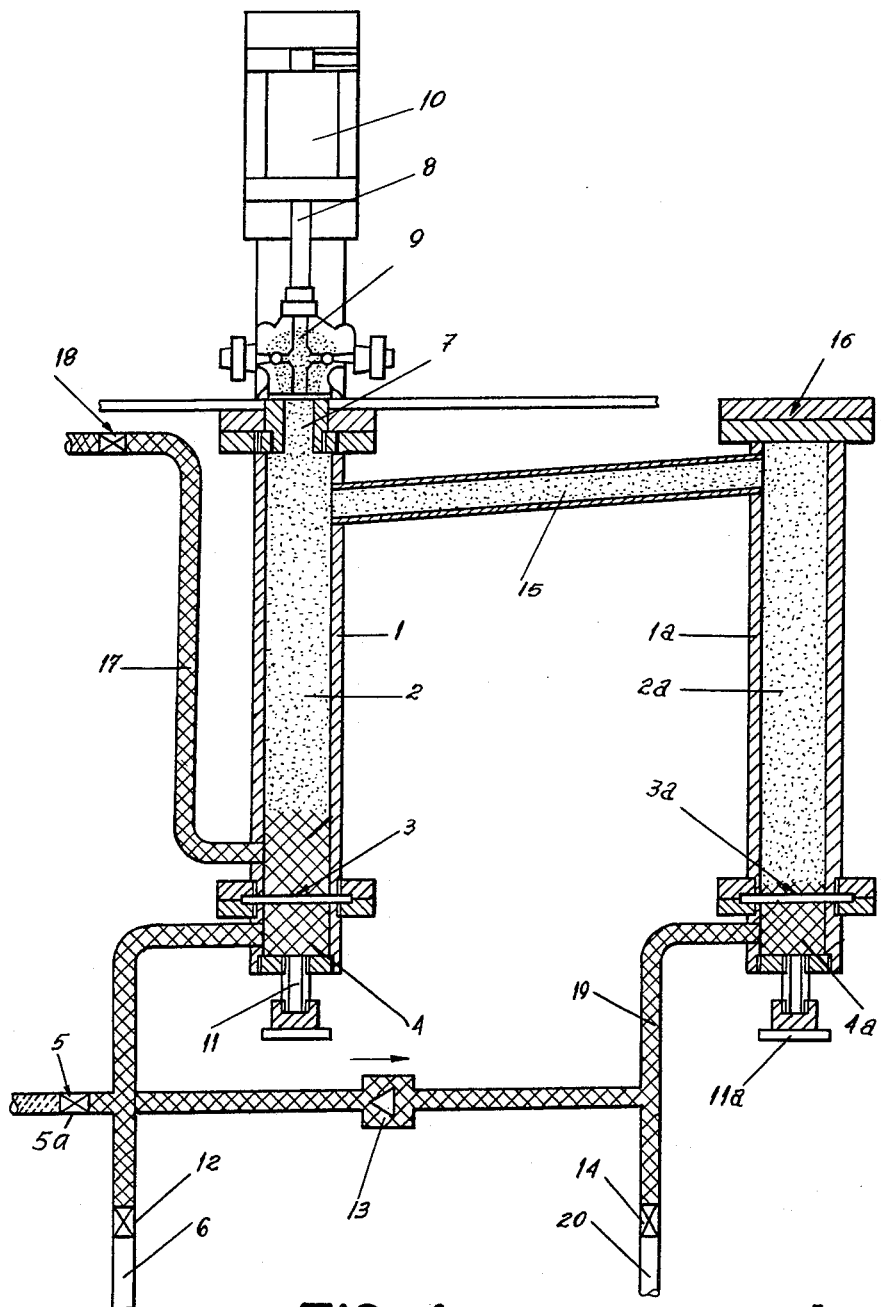
FIGURE 4 is a view similar to FIGURE 3 but illustrating the system in an operative position when high pressure air is applied to the sand in the system.
Figure 5:
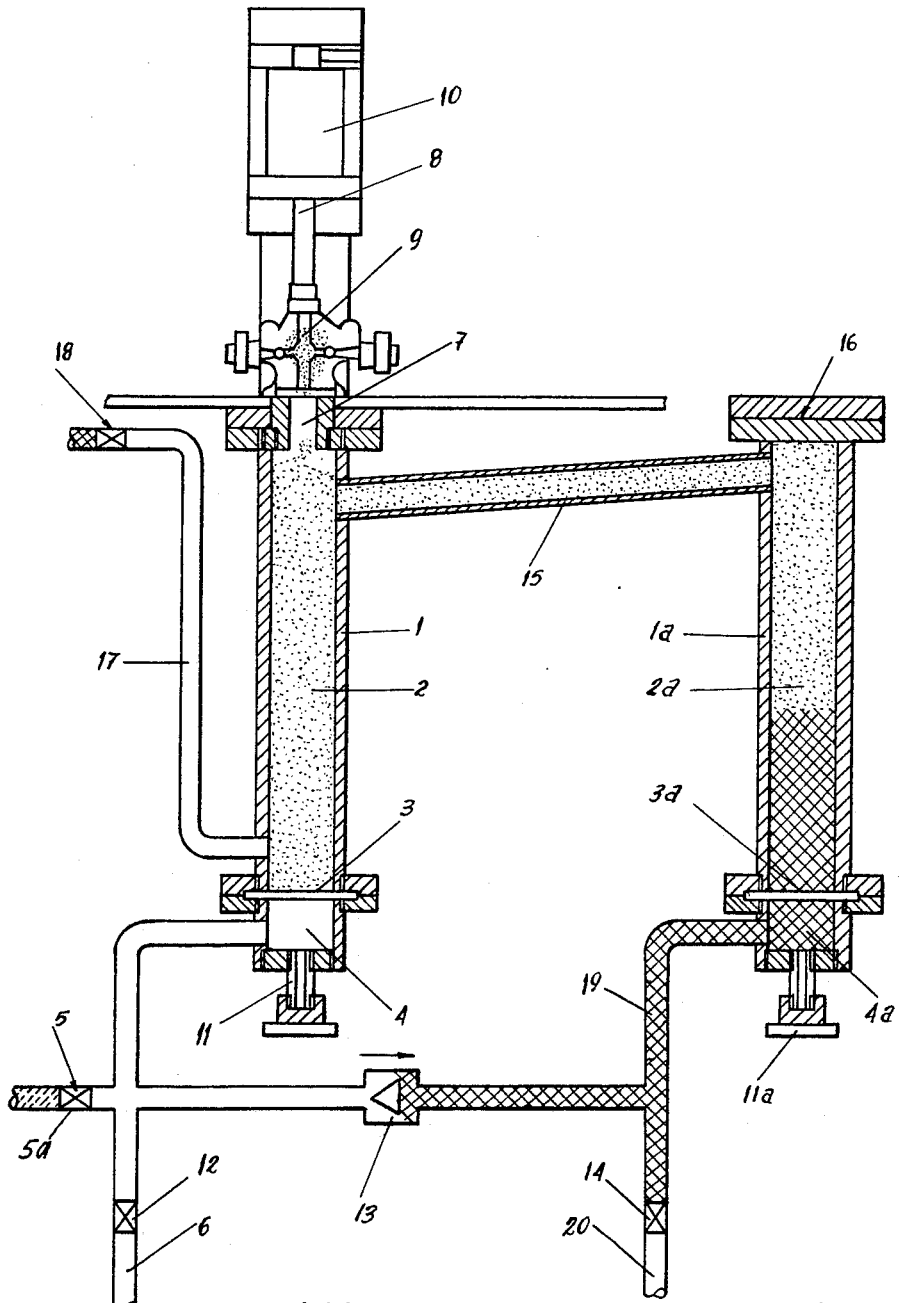
FIGURE 5 is a view similar to FIGURE 4 but illustrating the step in the methods of carrying out the present invention, wherein the high pressure air passed into the system is released.

After the mould is properly filled as shown in FIGURE 3, the valve 5a is closed as shown in FIGURE 4, and valves 12 and 14 are also maintained in a closed position while the valve 18 is opened. It will be seen in FIGURE 4 that the high pressure air then passes through the high pressure inlet line 17 and compresses the sand in the mould 9. It will also be noted that this high pressure air communicates with the crossconnecting line 19 and the chamber 4a and the chamber 4. Thus the system has high pressure air in it as indicated in FIGURE 4 up to the valve 5a, the valve 12 and the valve 14. Preferably the high air pressure introduced into the system by opening valve 18 is in the range of 6 to 7 kg./cm.$^2$ The position of this high pressure air in the system and the lifting of the sand in the tubes 2 and 2a is diagrammatically illustrated in FIGURE 4. It will be noted that the sand from the injector tube 1 does not pass into the supply tube 1a nor does the sand from the supply tube 1a pass into the injector tube 1 because the pressures in both chambers 4 and 4a at this time are equal. After the sand has been properly pressurized in the mould 9 as desired, the valve 18 is closed and the valve 12 is opened as best shown in FIGURE 5, so that the high pressure air is discharged through the filter 3 in the injection device 1 to the atmosphere through line 6. The one-way valve 13 in the crossconnecting line 19 has the high pressure air maintained therein until the air pressure in the lower portion of the supply tube 1a gradually decreases by passing through the sand in the upper portion of the tube 1a and the pipe 15 and the injection device 1. Thus the pressure between both tubes 1 and 1a is gradually equalized.

Figure 6:
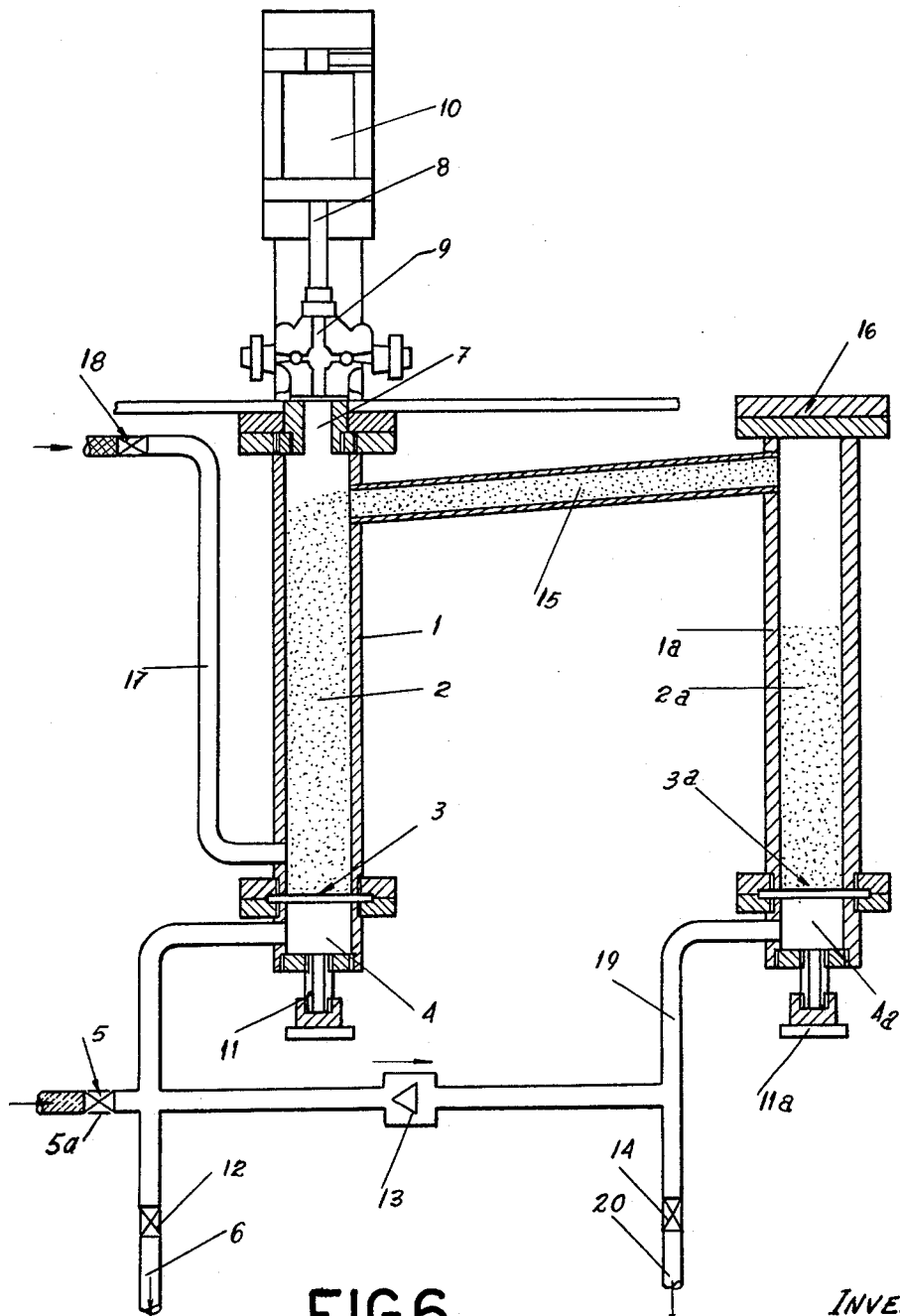
FIGURE 6 is a view similar to FIGURE 5 illustrating the position assumed by the sand in the system after the high pressure air is released, as shown in FIGURE 5.

Referring to FIGURE 6, the valve 14 may be opened after the step shown in FIGURE 5, so that the air pressure above atmospheric pressure may be released so that the system returns to atmospheric pressure.

From the foregoing description, it will be apparent that the present invention provides a novel apparatus and method of injecting sand or similar moulding material into a mould and which system provides filtering means for preventing any of the sand from flowing downstream so as to injure or damage the system or any of the valves in the system.

It is another feature of the present invention to provide a method of injecting sand into a mould by utilizing low pressure air first, and thereafter compacting the sand by injecting high pressure air into the system.

Another feature of the present invention is in the provision of an apparatus and method for supplying additional make-up sand from an additional supply tube as the sand in the injection tube or device is gradually used up in the mould that the sand fills.

Inasmuch as various changes may be made in the particular form, and arrangement of the apparatus and in the steps of the process and other sequences as disclosed without departing from the principles of the invention, it will be understood that the invention is not to be limited except by the scope of the appended claims.

What is claimed is:

1. The method of injecting a mixture of resin and sand into a mould cavity comprising taking two columns of said mixture and applying low pressure air through a filter against the bottom of said columns to force the mixture into said cavity, thereafter increasing said air pressure a substantial amount to compact the mixture in said cavity, thereafter releasing the air pressure applied against one column while maintaining said pressure against the bottom of the other column, thereafter permitting the pressure against said other column to progressively reduce to atmospheric pressure.

2. The method of claim 1 wherein said low pressure air is approximately 2 kg. per sq. cm. and said high pressure is between 7 to 8 kg. per sq. cm.

3. The method of claim 1 wherein said low and said high pressure air is flowed in one direction only against said another column.

4. The method of claim 3 wherein a portion of mixture in said another column is forced by said low and high air pressure into the top portion of said first mentioned column.

References Cited by the Examiner

UNITED STATES PATENTS

| | | | |
|---|---|---|---|
| 2,545,944 | 3/1951 | Ellms | 22—36 X |
| 2,779,074 | 1/1957 | Herbruggen | 22—193 |
| 2,798,266 | 7/1957 | Herbruggen | 22—193 X |
| 2,893,079 | 7/1959 | Moran et al. | 22—35 |
| 3,006,046 | 10/1961 | Shephard et al. | 22—193 |
| 3,007,216 | 11/1961 | Johnston | 22—35 |

J. SPENCER OVERHOLSER, *Primary Examiner.*

E. MAR, *Assistant Examiner.*